Patented Apr. 25, 1950

2,505,133

UNITED STATES PATENT OFFICE 2,505,133

TERTIARY ARYLAMINES AND PROCESS OF MAKING SAME

Karl Miescher and Willi Klarer, Riehen, Switzerland, assignors to Ciba Pharmaceutical Products Inc., Summit, N. J.

No Drawing. Application March 10, 1945, Serial No. 582,190. In Switzerland March 31, 1944

9 Claims. (Cl. 260—309.6)

According to the present invention tertiary arylamines are obtained by causing mono-salts of compounds of the formula

X—R—Y wherein R stands for an alkylene chain, X stands for a secondary arylamine group the nitrogen atom of which is connected with R, and Y stands for a stronger basic group, to react with reactive esters of alcohols.

As mono-salts of compounds of the foregoing formula there are particularly used mono-salts of strong acids, such as mono-salts of hydrohalogen acids, of sulfuric acid, of nitric acid, and of alkyl-, aralkyl- or arylsulfonic acids. In the indicated starting materials the arylamino group X may represent for example an unsubstituted or substituted aniline radical. As substituents there are named alkyl, alkenyl, nitro, free, esterified, or etherified hydroxy groups. The alkylene chain may be straight, branched or be part of a ring. Compounds having an ethylene, propylene, decamethylene, 2:2-dimethyl-propylene or cyclohexylene radical are thus suitable. The group Y represents a primary, secondary or tertiary amino group such as e. g. a mono- and dialkylamino, piperidino, morpholino, guanidino, amidino, imidazolono or tetrahydro-pyrimidino group.

Among reactive esters of alcohols are included esters of hydrohalogen acids, alkyl or aryl sulfonic acids. The alcohol radical may belong to the aliphatic, araliphatic, alicyclic or heterocyclic series; as examples there are named the methyl, ethyl, octyl, allyl, benzyl or cyclohexyl radical.

The reaction itself is carried out in the presence or absence of diluents, such as alcohol or dioxane, and it is also possible to work in the presence of catalysts.

The present process has proved to be particularly advantageous. Experiments which applicants have carried out have shown that N-(β-dimethylaminoethyl)- or N-(γ-dimethyl-aminopropyl)-N-benzylaniline from N-benzylaniline and β-dimethylamino-ethyl- or γ-dimethylaminopropyl-chloride, respectively, can be obtained only in poor yield. Moreover, N-benzyl-2-methyl-aniline could not be converted into N-(β-diethylamino-ethyl)-N-benzyl-2-methylaniline with β-diethylamino-ethyl-chloride. Further, it has been ascertained that in the reaction of N-(β-dimethylamino-ethyl)-aniline with benzylchloride the tertiary nitrogen atom forms a quaternary compound. Besides, it is surprising that in the reaction according to the present process free NH- or NH₂-groups within the radical Y are not attacked and quaternary compounds are not formed.

The new compounds possess therapeutic activities and can be used as therapeutic substances or as intermediate products for the manufacture thereof.

The following examples illustrate the invention, but are not to be regarded as limiting it in any way, the parts being by weight.

Example 1

20 parts of N-(β-dimethylamino-ethyl)-aniline-monohydrochloride in 50 parts of absolute alcohol are heated to boiling for some hours on the water-bath with 7 parts of allylbromide. The alcohol is distilled off and the residue taken up in water. After addition of alkali the whole is extracted with ether and the residue of the ethereal extract subjected to distillation, the N-allyl-N-(β-dimethylamino-ethyl)-aniline which has been formed passing over at 138–141° C. under 11 mm. pressure. A mono-hydrochloride of melting point 160–161° C. is formed.

Instead of the hydrochloride of N-(β-dimethylamino-ethyl)-aniline also the salt of another strong acid, for example the salt of hydrobromic acid, sulfuric acid, nitric acid or of an alkyl- or an arylsulfonic acid may be caused to react.

Instead of allylbromide there can also be used allylchloride.

The same compound is also obtained when starting from the free N-(β-dimethylamino-ethyl)-aniline and a quantity of alcoholic hydrochloric acid corresponding to the mono-hydrochloride.

Example 2

24.2 parts of N-(γ-diethylamino-propyl)-aniline-monohydrochloride (of melting point 122–123° C.; obtained from aniline and γ-diethylamino-propylchloride-hydrochloride) are dissolved in 100 parts of absolute alcohol and heated to boiling for several hours on the water-bath with 7 parts of benzylchloride. The product is worked up as described in Example 1. The N-benzyl-N-(γ-diethylamino-propyl)-aniline is distilled at 218–219° C. under 10 mm. pressure; its mono-hydrochloride melts at 131–132° C.

The same compound is obtained when using benzyl bromide or benzyl-para-toluene-sulfonic acid ester instead of benzyl chloride.

Example 3

A solution of 24.4 parts of N-(γ-dimethylamino-propyl)-2-anisidine-mono-hydrochloride (of melting point 152–153° C.; prepared by reaction of γ-dimethylamino-propyl-chloride hydrochloride with 2-anisidine) in 100 parts of absolute alcohol is kept boiling for a long time with 7 parts of benzylchloride. After distilling off the alcohol in a vacuum, the N-benzyl-N-(γ-dimethylamino-propyl)-2-anisidine is isolated from the residue, as described in Example 1. The new base boils at 208–210° C. under 11 mm. pressure; its mono-hydrochloride melts at 151–152° C.

Instead of 24.4 parts, there can also be used 12.2 parts of N-(γ-dimethylamino-propyl)-2-anisidine in the above reaction, the acid which has been formed being neutralized in the course of the reaction by addition of, e. g. sodium ethylate.

*Example 4*

If 18.6 parts of N-(β-methylaminoethyl)-aniline-mono-hydrochloride are caused to react with 7 parts of benzylchloride as described in the foregoing examples, there is obtained N-benzyl-N-(β-methylamino-ethyl)-aniline of boiling point 210–212° C. under 13 mm. pressure, the monohydrochloride of which melts at 174–175° C.

By methylating the base with dimethylsulfate there is obtained the N-benzyl-N-(β-dimethylamino-ethyl)-aniline (mono-hydrochloride of melting point 200–202° C.). This base can also be obtained by causing N-(β-dimethylamino-ethyl)-aniline-mono-hydrochloride to react with benzyl chloride.

*Example 5*

If 17.2 parts of N-(β-amino-ethyl)-aniline-mono-hydrochloride are caused to react with 7 parts of benzylchloride, as indicated in Example 1, there is obtained N-benzyl-N-(β-amino-ethyl)-aniline of boiling point 206–208° C. under 14 mm. pressure (mono-hydrochloride melts at 193–194° C.).

Determination of the nitrogen according to Van Slyke has shown that in this kind of reaction the primary amino group of N-(β-aminoethyl)-aniline remains unattached.

*Example 6*

A solution of 21 parts of 2-(phenylaminomethyl)-imidazoline-mono-hydrochloride and 8 parts of benzylchloride in 100 parts of alcohol is boiled for some hours in a reflux condenser. The solvent is then distilled off, the residue mixed with water and neutralized with sodium bicarbonate. The 2-(N-phenyl-N-benzyl-aminomethyl)-imidazoline hydrochloride which has precipitated after a short time is suction-filtered. After recrystallization from little water it melts at 227–229° C.

In this reaction the alcohol can be also replaced by another solvent, e. g. butyl alcohol, dioxane or benzylchloride itself.

The following compounds, for example, can also be prepared analogously to the processes described in the foregoing examples:

N-(β-diethylamino-ethyl)-N-ethyl-aniline of boiling point 149–150° C. under 11 mm. pressure;

N-(β-diethylamino-ethyl)-N-benzyl-aniline of boiling point 209–210° C. under 11 mm. pressure;

N-(β-dimethylamino-ethyl)-N-benzyl-2-methyl-aniline of boiling point 181–184° C. under 11 mm. pressure;

N-(β-dimethylamino-ethyl)-N-benzyl-2-methoxy-aniline of boiling point 200–206° C. under 11 mm. pressure;

N-(β-dimethylamino-ethyl)-N-benzyl-4-methoxy-aniline of boiling point 219–221° C. under 12 mm. pressure;

N-(β-dimethylamino-ethyl)-N-benzyl-2-ethoxy-5-methyl-aniline of boiling point 141–143° C. under 0.1 mm. pressure;

N-(β-dimethylamino-ethyl)-N-benzyl-2-ethoxy-aniline of boiling point 200–203° C. under 10 mm. pressure;

N-(β-dimethylamino-ethyl)-N-phenylethyl-aniline of boiling point 210–211° C. under 12 mm. pressure;

N-(β-dimethylamino-ethyl)-N-(4'-methoxybenzyl)-aniline of boiling point 225–227° C. under 12 mm. pressure;

N-(β-dimethylamino-ethyl)-N-(3'-methoxybenzyl)-aniline of boiling point 217–218° C. under 12 mm. pressure;

N-(β-piperidino-ethyl)-N-benzyl-aniline of boiling point 201–205° C. under 0.1 mm. pressure;

N-(β-piperidino-ethyl)-N-(3-methoxybenzyl)-aniline of boiling point 215–218° C. under 0.8 mm. pressure;

2-[N-(2'-methoxyphenol)-N-benzyl-aminomethyl]-imidazoline hydrochloride of melting point 168–169° C.;

2-[N-(4'-methoxyphenyl)-N-benzyl-aminomethyl]-imidazoline hydrochloride of melting point 206–208° C.;

2-[N-(2'-ethoxyphenyl)-N-benzyl-aminomethyl]-imidazoline hydrochloride of melting point 187–188° C.;

2-[N-(4'-ethoxyphenyl)-N-benzyl-aminomethyl]-imidazoline hydrochloride of melting point 216–218° C.;

2-[N-naphthyl-(1')-N-benzyl-aminomethyl]-imidazoline hydrochloride of melting point 207–209° C.;

2-[N-phenyl-N-benzyl-aminopropyl]-imidazoline hydrochloride of melting point 193–195° C.;

2-[β-(N-phenyl-N-benzyl-amino)-ethyl-amino]-imidazoline hydrochloride of melting point 115–116° C.

The parent materials used for the production of the above compounds, as far as they are not known, may be prepared according to known methods.

What we claim is:

1. Process for the manufacture of a tertiary arylamine which comprises causing a mono-salt of a strong acid of a compound of the formula

wherein R stands for an alkylene chain, X for an aryl radical and Y represents a member of the group consisting of the amino group, mono- and dialkylamino and amidino groups, to react with an ester of an acid of the group consisting of hydrohalogen acids and sulfonic acids with an alcohol of the group consisting of aliphatic and araliphatic alcohols.

2. Process for the manufacture of a tertiary arylamine which comprises causing a mono-salt of a strong acid of a compound of the formula

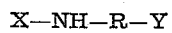

wherein R stands for an alkylene chain, X for a phenyl radical, and Y represents an imidazoline group, to react with an ester of a hydrohalogen acid with an alcohol of the group consisting of aliphatic and araliphatic alcohols.

3. Process for the manufacture of a tertiary arylamine, comprising causing an N-(β-dialkylamino-alkyl)-aniline-mono-hydrogen halide salt to react with an araliphatic halide.

4. Process for the manufacture of a tertiary arylamine, comprising causing N-(β-dimethyl-amino-ethyl)-aniline-mono-hydrochloride to react with benzyl chloride.

5. Process for the manufacture of a tertiary arylamine, comprising causing 2-[β-(phenylamino)-ethylamino]-imidazoline-mono-hydrochloride to react with benzyl chloride.

6. Process for the manufacture of a tertiary arylamine, comprising causing a 2-(phenyl-amino-alkyl)-imidazoline-mono-hydrogen halide salt to react with an araliphatic halide.

7. Process for the manufacture of a tertiary arylamine, comprising causing 2-(phenylamino-methyl)-imidazoline-mono-hydrochloride to react with benzyl chloride.

8. 2-[β-(N-phenyl-N-benzyl-amino)-ethylamino]-imidazoline.

9. In the process of making N-benzyl-N-phenyl-N',N'-dimethyl-ethylenediamine the step comprising heating in an organic solvent a mixture of the monohydrochloride of N-phenyl-N',N'-dimethyl-ethylenediamine and benzyl chloride.

KARL MIESCHER.
WILLI KLARER.

REFERENCES CITED

The following references are of record in the file of this patent:

UNITED STATES PATENTS

| Number | Name | Date |
|---|---|---|
| 1,752,617 | Schuleman | Apr. 1, 1930 |
| 1,757,394 | Schuleman | May 6, 1930 |
| 2,058,615 | Morton | Oct. 27, 1936 |
| 2,252,721 | Miescher | Aug. 19, 1941 |
| 2,302,805 | Schussler | Nov. 24, 1942 |

FOREIGN PATENTS

| Number | Country | Date |
|---|---|---|
| 541,474 | Germany | Jan. 13, 1932 |
| 853,735 | France | Mar. 27, 1940 |

Certificate of Correction

Patent No. 2,505,133 April 25, 1950

KARL MIESCHER ET AL.

It is hereby certified that error appears in the printed specification of the above numbered patent requiring correction as follows:

Column 3, line 43, for the word "unattached" read *unattacked*;

and that the said Letters Patent should be read with this correction therein that the same may conform to the record of the case in the Patent Office.

Signed and sealed this 22nd day of August, A. D. 1950.

[SEAL]

THOMAS F. MURPHY,
*Assistant Commissioner of Patents.*